Patented Feb. 8, 1949

2,461,349

UNITED STATES PATENT OFFICE 2,461,349

COMPOUNDS MODIFIED BY ABIETIC NITRILES

Anderson W. Ralston and Hoyt M. Corley, Chicago, Ill., assignors to Armour and Company, Chicago, Ill., a corporation of Illinois No Drawing. Application October 29, 1943, Serial No. 508,254

11 Claims. (Cl. 260—27)

This invention relates to synthetic elastomers and it comprises synthetic elastomers containing nitriles of abietic acid or nitriles of tallol and processes for preparing such elastomers.

The development of synthetic elastomers, such as the so called synthetic rubbers, has created many problems respecting ways of compounding such elastomers as well as ways of making them. In the early development of the so called synthetic rubber, efforts were made to reproduce natural rubber synthetically. In later years it has been found that rubber-like polymers could be prepared which have characteristics quite different from ordinary natural rubber and that such characteristics or properties particularly suit these synthetic products for many uses to which rubber itself was not well adapted. For example, many of these synthetic elastomers have high oil resistance and high acid and alkali resistance, much higher than that of natural rubber. Consequently, such synthetic products can be used in many relations where natural rubber is at a distinct disadvantage.

In order to form a useful rubber product it is necessary to admix with these elastomers substances which serve to soften, extend and plasticize them or to impart other desirable properties. Plasticizers, softeners and the like have also been added to natural rubber, but the agents used in connection with natural rubber are not in many instances adaptable for compounding synthetic rubbers.

We have now discovered organic compounds which are particularly useful in the compounding of synthetic elastomers. These compounds are nitriles which may be derived from abietic acid or from tallol. Tallol is a by-product of the paper industry and contains abietic acid along with fatty acids including oleic acid and linoleic acid.

In preparing the tallol nitriles from the crude tallol, this material may first be acidulated in well known ways to obtain an acid mixture which includes abietic acid and fatty acids. This mixture may then be reacted in liquid phase with ammonia at a temperature of from 600 to 750 degrees F. to obtain the tallol nitriles. Alternatively the tallol acid mixture may be reacted in vapor form with ammonia by passing the reactants over a dehydrating catalyst at temperature from 750 to 800 degrees F.

Instead of the tallol acid nitrile mixture we can use the nitriles prepared in a similar way from the abietic acid alone.

We have discovered that such nitriles are compatible with synthetic elastomers and that the incorporation of these nitriles in the elastomers aids markedly in the compounding thereof with sulphur, vulcanization accelerators, and the like. The inclusion of such nitriles in synthetic elastomers materially improves the cold flexibility of these substances.

Indeed, it is believed that these nitriles do more than merely modify the elastomers. Nitriles of the character specified undergo polymerization and sulphur is a polymerizing agent which will convert the nitriles to polymerized products. Thus, for example, a mixture of 90 parts of butadiene-styrene copolymer with 10 parts of tallolnitrile together with sulphur and accelerators are what gives the vulcanized product its soft rubber qualities superior to that obtained when the butadiene-styrene copolymer is vulcanized in the absence of such nitriles. We believe that the tallolnitrile polymerizes to some extent in the presence of the sulphur and that the nitrile forms a kind of copolymer with other constituents present. The polymerized nitriles as such can be used to special advantage in the compounding of synthetic elastomers according to our invention. Such polymerized nitriles can be made by subjecting the abietic acid nitriles or the tallolnitriles to the action of polymerizing catalysts as fully described in the Ralston Patent 2,175,092.

The amount of such nitriles which may be incorporated in the synthetic elastomers is subject to variation of wide limits. In general from 5 to 20% of the nitriles are used, this percentage being based on the weight of the synthetic elastomer. Among the elastomers which are beneficially improved by these nitriles may be mentioned the following: butadiene polymers as such, usually made by polymerizing butadiene (having the structure $CH_2=CH-CH=CH_2$) with sodium; butadiene copolymers such as those made by polymerizing a mixture of butadiene and styrene or butadiene and acrylonitrile; isoprene polymers; chloroprene polymers; polyisobutylene; the various vinyl polymers such as polymers of polyvinyl alcohol, polyvinyl chloride, polyvinylidene chloride; and the like. Our nitriles can also be used for compounding those rubber-like products known as the Thiokols made from ethylene dichloride, or dichloroethyl ether, and sodium sulphides.

All of the above listed synthetic elastomers are substances having rubber like characteristics although the elasticity may vary markedly and in fact can be controlled as desired. By synthetic elastomers in this specification and in the claims, we mean to include only those materials referred to in the preceeding paragraph.

In all instances our nitriles can be admixed with the synthetic elastomers in the compounding thereof to give articles of commerce.

We shall now give examples of ways of combining nitriles with synthetic elastomers in the present invention.

Example I 100 parts of a butadiene acrylonitrile copolymer are mixed with 10 parts of a nitrile prepared from the mixed acids of tallol, 5 parts of sulfur and 10 parts of zinc oxide and alcohol, together with any suitable accelerator. The nitriles used are obtained from tallol acids which have been distilled and are prepared by passing these allol acids over an aluminum oxide catalyst in the presence of ammonia at an elevated temperature. The polymer, nitrile, sulfur, etc. is thoroughly mixed by rolling and is then vulcanized in the usual manner. The product is a synthetic elastomer possessing high oil resistance and high resistance to abrasives. It retains its flexibility when cooled to quite low temperatures such as −30 to −45° F.

Example II

The mixed acids of tallol are subjected to fractional distillation to obtain a lower boiling fraction containing predominantly abietic acid. This lower boiling fraction is reacted with ammonia in the presence of an aluminum oxide catalyst to prepare the corresponding nitrile of the abietic acid fraction. 10 parts of this abietic acid fraction are mixed with 100 parts of the butadiene acrylonitrile copolymer mentioned in Example I, together with 5 parts of sulfur, 50 parts of carbon black and an accelerator. The mixture of copolymer, abietic acid nitrile, etc. is milled and vulcanized. The product obtained is an elastomer possessing high oil resistance and excellent low temperature characteristics.

Example III 100 parts of a hydrocarbon polymer prepared by polymerization of butadiene in the presence of saccharin are mixed with 10 parts of nitriles prepared from tallol fatty acids, 5 parts of sulfur, 50 parts of carbon, 3 parts of stearic acid and a small amount of accelerator. This mixture is mixed and vulcanized in the usual manner. The product is an elastomer possessing excellent low temperature characteristics.

Example IV 100 parts of polymerized chloroprene (alpha-chlorobutadiene) are mixed with 10 parts of nitriles prepared from the abietic acid fraction of tallol together with 5 parts of sulfur, 20 parts of carbon and a small amount of diphenyl guanidine. The mixture is milled and vulcanized in the usual manner. The product is an elastomer which possesses excellent oil resistance and superior low temperature characteristics.

Example V 100 parts of polymerized vinyl chloride are mixed with 15 parts of tallol nitriles prepared as described in examples previously given, together with 5 parts of sulfur and a small amount of accelerator. The mixture is milled and vulcanized to yield an elastomer.

Another important way of incorporating our special nitriles derived from abietic acid or tallol acid in synthetic elastomers is one in which the nitrile is incorporated with the elastomer during the process of forming the latter. Most of these synthetic compounds are prepared by polymerizing the polymerizible constituents while emulsified in water. For example, butadiene and styrene are emulsified in water containing a polymerization catalyst and the mixture is then subjected to polymerizing conditions, usually involving elevated temperatures. Thereafter the copolymer so formed is separated from the emulsion by coagulation. In practising this feature of our invention we emulsify the special nitrile along with the other constituents and polymerize the entire mixture in one step. Thus, we avoid the necessity for specially milling or otherwise compounding the special nitriles with the elastomers. Moreover, we gain the benefits of a homogeneous coagulum in which we believe the nitrile is co-polymerized with other constituents.

An example of proceeding in this modified way is given as follows:

Example VI 75 parts of butadiene are mixed with 25 parts of acrylonitrile, 20 parts of tallol nitriles and a small amount of an oxidizing catalyst and the mixture heated until a polymer is formed. This polymer can then be vulcanized to yield an elastomer or it can be used per se as a coating material for paper, cloth, etc. When so used it can be incorporated with high molecular aliphatic amides, ketones or other similar materials.

The foregoing detailed description has been given for purposes of explanation only, and it is expected that many variations and modifications may be made in the manner of practising our improvements all within the spirit of the invention.

What we claim and desire to procure in Letters Patent is:

1. A process for preparing synthetic elastomer compound comprising mixing a tallolnitrile with butadiene, and thereafter polymerizing the mixture to form a synthetic elastomer compound.

2. A process for preparing a synthetic elastomer compound comprising mixing a tallolnitrile with butadiene and acrylonitrile, and thereafter polymerizing the mixture to form a synthetic elastomer compound.

3. A composition of matter comprising a synthetic rubber prepared by the polymerization of butadiene, and, as a softener therefore, a tallolnitrile.

4. A composition selected from the class consisting of butadiene polymers, butadiene-acrylonitrile copolymers, isoprene polymers, chloroprene polymers, and polyisobutylene, which composition contains a nitrile produced by the reaction of abietic acid and ammonia at elevated temperature and serving as a plasticizer in said composition.

5. A composition selected from the class consisting of butadiene polymers, butadiene-acrylonitrile copolymers, isoprene polymers, chloroprene polymers, and polyisobutylene, which composition contains a nitrile produced by the reaction of tallol and ammonia at elevated temperature and serving as a plasticizer in said composition.

6. A composition selected from the class consisting of butadiene polymers, butadiene-acrylonitrile copolymers, isoprene polymers, chloroprene polymers, and polyisobutylene, which composition contains a polymerized nitrile produced by the reaction of tallol and ammonia at elevated temperature and serving as a plasticizer in said composition.

7. A vulcanized composition selected from the class consisting of butadiene polymers, butadiene acrylonitrile copolymers, isoprene polymers, chloroprene polymers, and polyisobutylene, which composition contains a nitrile produced by the reaction of abietic acid and ammonia at elevated temperature and serving as a plasticizer in said composition.

8. A vulcanized composition selected from the class consisting of butadiene polymers, butadiene-acrylonitrile copolymers, isoprene polymers, chloroprene polymers, and polyisobutylene, which composition contains a nitrile produced by the reaction of tallol and ammonia at elevated temperature and serving as a plasticizer in said composition.

9. A composition selected from the class consisting of butadiene polymers, butadiene-acrylonitrile copolymers, isoprene polymers, chloroprene polymers, and polyisobutylene, which composition contains an oxygenized nitrile produced by the reaction of tallol and ammonia at elevated temperature and serving as a plasticizer in said composition.

10. A process for preparing a vulcanized material comprising mixing a nitrile produced by the reaction of tallol and ammonia at elevated temperature and a polymerized compound chosen from the class consisting of butadiene polymers, butadiene-acrylonitrile copolymers, isoprene polymers, chloroprene polymers, and polyisobutylene, with sulfur, and vulcanizing the mixture, said nitrile serving as a plasticizer in said material.

11. In a process for preparing a polymer material, the step of mixing a nitrile produced by the reaction of tallol and ammonia at elevated temperature with a polymerized compound chosen from the class consisting of butadiene polymers, butadiene-acrylonitrile copolymers, isoprene polymers, chloroprene polymers, polyisobutylene, and vulcanizing the mixture, said nitrile serving as a plasticizer in said material.

ANDERSON W. RALSTON.
H. M. CORLEY.

REFERENCES CITED

The following references are of record in the file of this patent:

UNITED STATES PATENTS

| Number | Name | Date |
|---|---|---|
| 2,319,634 | Sauser | May 18, 1943 |

FOREIGN PATENTS

| Number | Country | Date |
|---|---|---|
| 749,970 | France | May 15, 1933 |

OTHER REFERENCES

Fisher, Chemical and Engineering News, May 25, 1943, vol. 21, No. 10, page 745.

Dinsmore, Chemical and Engineering News, November 10, 1943, pages 1798–1801.

Fisher, Industrial and Eng. Chemistry, Aug. 1939 pages 941 to 944.

Mattiello, "Protective and Decorative Coatings," pages 186–187, vol. 1, (Wiley, 1941).

Brous et al., Ind. & Eng. Chem., vol. 27, No. 6, page 667.